US012106723B2

(12) United States Patent
Kim

(10) Patent No.: US 12,106,723 B2
(45) Date of Patent: Oct. 1, 2024

(54) METHOD OF GENERATING COMPENSATION DATA, TEST DEVICE, AND DISPLAY DEVICE

(71) Applicant: Samsung Display Co., Ltd., Yongin-Si (KR)

(72) Inventor: Keeyong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/518,624

(22) Filed: Nov. 24, 2023

(65) Prior Publication Data

US 2024/0274088 A1 Aug. 15, 2024

(30) Foreign Application Priority Data

Feb. 14, 2023 (KR) ........................ 10-2023-0019314

(51) Int. Cl.
*G09G 3/3266* (2016.01)
*G09G 3/00* (2006.01)
*G09G 3/3291* (2016.01)

(52) U.S. Cl.
CPC ........... *G09G 3/3266* (2013.01); *G09G 3/006* (2013.01); *G09G 3/3291* (2013.01); *G09G 2320/0233* (2013.01); *G09G 2320/0271* (2013.01); *G09G 2330/12* (2013.01); *G09G 2360/14* (2013.01)

(58) Field of Classification Search
CPC .... G09G 3/3266; G09G 3/006; G09G 3/3291; G09G 2320/0233; G09G 2320/0271; G09G 2360/14
See application file for complete search history.

(56) References Cited

U.S. PATENT DOCUMENTS

2006/0066643 A1 3/2006 Arai et al.
2007/0109321 A1 5/2007 Yu et al.
2017/0116931 A1* 4/2017 Matsui ..................... G09G 3/36
2021/0327343 A1* 10/2021 Han ..................... G09G 3/3225

* cited by examiner

*Primary Examiner* — Abhishek Sarma
(74) *Attorney, Agent, or Firm* — Innovation Counsel LLP

(57) ABSTRACT

A method of generating compensation data for a display device is disclosed that includes acquiring a first captured image by capturing an image displayed on the display device based on reference data having a reference grayscale, acquiring a second captured image by capturing an image displayed on the display device based on evaluation data having a compensation target grayscale, calculating a similarity index based on a difference between the first captured image and the second captured image at a plurality of positions of a display panel of the display device, calculating a quality index based on an actual measured grayscale of the second captured image after compensation of the second captured image, generating a compensation prediction model based on the similarity index and the quality index, and generating the compensation data based on the first captured image, the second captured image, the similarity index, and the compensation prediction model.

20 Claims, 15 Drawing Sheets

FIG. 2

| | | | | | |
|---|---|---|---|---|---|
| PX11 (127G) | PX12 (127G) | PX13 (127G) | PX14 (127G) | PX15 (127G) | PX16 (127G) |
| PX21 (127G) | PX22 (127G) | PX23 (127G) | PX24 (127G) | PX25 (127G) | PX26 (127G) |
| PX31 (127G) | PX32 (127G) | PX33 (127G) | PX34 (127G) | PX35 (127G) | PX36 (127G) |
| PX41 (127G) | PX42 (127G) | PX43 (127G) | PX44 (127G) | PX45 (127G) | PX46 (127G) |
| PX51 (127G) | PX52 (127G) | PX53 (127G) | PX54 (127G) | PX55 (127G) | PX56 (127G) |
| PX61 (127G) | PX62 (127G) | PX63 (127G) | PX64 (127G) | PX65 (127G) | PX66 (127G) |

FIG. 8

| | | | | | |
|---|---|---|---|---|---|
| PX11 (127G) | PX12 (127G) | PX13 (127G) | PX14 (127G) | PX15 (127G) | PX16 (127G) |
| PX21 (127G) | PX22 (127G) | PX23 (127G) | PX24 (127G) | PX25 (127G) | PX26 (127G) |
| PX31 (127G) | PX32 (127G) | PX33 (127G) | PX34 (127G) | PX35 (127G) | PX36 (127G) |
| PX41 (127G) | PX42 (127G) | PX43 (127G) | PX44 (127G) | PX45 (127G) | PX46 (127G) |
| PX51 (127G) | PX52 (127G) | PX53 (127G) | PX54 (127G) | PX55 (127G) | PX56 (127G) |
| PX61 (127G) | PX62 (127G) | PX63 (127G) | PX64 (127G) | PX65 (127G) | PX66 (127G) |

FIG. 12

| | | | | | |
|---|---|---|---|---|---|
| PX11 (100G) | PX12 (100G) | PX13 (100G) | PX14 (100G) | PX15 (100G) | PX16 (100G) |
| PX21 (100G) | PX22 (100G) | PX23 (100G) | PX24 (100G) | PX25 (100G) | PX26 (100G) |
| PX31 (100G) | PX32 (100G) | PX33 (100G) | PX34 (100G) | PX35 (100G) | PX36 (100G) |
| PX41 (100G) | PX42 (100G) | PX43 (100G) | PX44 (100G) | PX45 (100G) | PX46 (100G) |
| PX51 (100G) | PX52 (100G) | PX53 (100G) | PX54 (100G) | PX55 (100G) | PX56 (100G) |
| PX61 (100G) | PX62 (100G) | PX63 (100G) | PX64 (100G) | PX65 (100G) | PX66 (100G) |

METHOD OF GENERATING COMPENSATION DATA, TEST DEVICE, AND DISPLAY DEVICE

This application claims priority under 35 USC § 119 to Korean Patent Application No. 10-2023-0019314 filed on Feb. 14, 2023 in the Korean Intellectual Property Office (KIPO), the entire disclosure of which is incorporated by reference herein.

BACKGROUND

1. Field

Embodiments of the present inventive concept relate to a display device. More particularly, embodiments of the present inventive concept relate to a method of generating compensation data, a test device, and a display device.

2. Description of the Related Art

Even if pixels included in a display device are manufactured through the same process, the display device may have different luminance or stain due to a process deviation of producing the pixels. In order to remove the stain and improve uniformity of the luminance, stain correction may be performed by capturing an image displayed on the display device, generating compensation data based on the captured image, and applying the compensation data to the display device.

A first captured image may be displayed on the display device based on reference data having a reference grayscale, and a second captured image may be displayed on the display device based on evaluation data having a compensation target grayscale. The second captured image may be compensated by generating the compensation data based on the first captured image.

However, when the first captured image and the second captured image are not similar, even if the second captured image is compensated, quality of the second captured image after the compensation may rather decrease. In addition, the quality of the second captured image after the compensation may not be predicted.

SUMMARY

Embodiments of the present inventive concept may provide a method of generating compensation data for generating accurate compensation data for a display device and predicting quality after compensation.

Embodiments of the present inventive concept may provide a test device for generating accurate compensation data for a display device and predicting quality after compensation.

Embodiments of the present inventive concept may provide a display device for generating accurate compensation data and predicting quality after compensation.

An embodiment of a method of generating compensation data for a display device may include acquiring a first captured image by capturing an image displayed on the display device based on reference data having a reference grayscale, acquiring a second captured image by capturing an image displayed on the display device based on evaluation data having a compensation target grayscale, calculating a similarity index based on a difference between the first captured image and the second captured image at a plurality of positions of a display panel of the display device, calculating a quality index based on an actual measured grayscale of the second captured image after compensation of the second captured image, generating a compensation prediction model based on the similarity index and the quality index, and generating the compensation data based on the first captured image, the second captured image, the similarity index, and the compensation prediction model.

In an embodiment, the quality index may be a ratio of minimum luminance of the actual measured grayscale of the second captured image after the compensation of the second captured image to maximum luminance of the actual measured grayscale of the second captured image after the compensation of the second captured image.

In an embodiment, the compensation prediction model may be generated through linear regression for the similarity index and the quality index.

In an embodiment, the compensation data may be generated when the similarity index is greater than a threshold value.

In an embodiment, calculating the similarity index may include, filtering the first captured image into a low-frequency image of the first captured image and a high-frequency image of the first captured image, and filtering the second captured image into a low-frequency image of the second captured image and a high-frequency image of the second captured image, generating a contour image of the low-frequency image of the first captured image classified into a plurality of groups according to an actual measured grayscale from the low-frequency image of the first captured image, a contour image of the high-frequency image of the first captured image classified into a plurality of groups according to the actual measured grayscale from the high-frequency image of the first captured image, a contour image of the low-frequency image of the second captured image classified into a plurality of groups according to the actual measured grayscale from the low-frequency image of the second captured image, and a contour image of the high-frequency image of the second captured image classified into a plurality of groups according to the actual measured grayscale from the high-frequency image of the second captured image, at the positions of the display panel of the display device, calculating a first similarity index based on the contour image of the low-frequency image of the first captured image and the contour image of the low-frequency image of the second captured image and calculating a second similarity index based on the contour image of the high-frequency image of the first captured image and the contour image of the high-frequency image of the second captured image, and calculating the similarity index based on the first similarity index and the second similarity index.

In an embodiment, the similarity index may be determined using an equation "$SI=SI1*m+SI2*(1-m)$", where SI is the similarity index, SI1 is the first similarity index, SI2 is the second similarity index, and m is a real number greater than 0 and less than 1.

In an embodiment, the method may further include predicting a first quality index for a first evaluation data by inputting the first evaluation data different from the reference data and the evaluation data into the compensation prediction model.

An embodiment of a test device that generates compensation data for a display device may include a data providing block configured to provide reference data having a reference grayscale to the display device and evaluation data having a compensation target grayscale to the display device, a camera configured to acquire a first captured image by capturing an image displayed on the display device based on the reference data and to acquire a second captured image by an image displayed on the display device based on the evaluation data; and a compensation data generating block configured to: calculate a similarity index based on a difference between the first captured image and the second captured image at a plurality of positions of a display panel of the display device; calculate a quality index based on an actual measured grayscale of the second captured image after compensation of the second captured image; generate a compensation prediction model based on the similarity index and the quality index; and generate the compensation data based on the first captured image, the second captured image, the similarity index, and the compensation prediction model.

In an embodiment, the quality index may be a ratio of minimum luminance of the actual measured grayscale of the second captured image after the compensation of the second captured image to maximum luminance of the actual measured grayscale of the second captured image after the compensation of the second captured image.

In an embodiment, the compensation prediction model may be generated through linear regression for the similarity index and the quality index.

In an embodiment, the compensation data generating block may be configured to compare the similarity index with a threshold value, and to generate the compensation data when the similarity index is greater than the threshold value.

In an embodiment, the compensation data generating block may be configured to: filter the first captured image into a low-frequency image of the first captured image and a high-frequency image of the first captured image; filter the second captured image into a low-frequency image of the second captured image and a high-frequency image of the second captured image; generate a contour image of the low-frequency image of the first captured image classified into a plurality of groups according to an actual measured grayscale from the low-frequency image of the first captured image, a contour image of the high-frequency image of the first captured image classified into a plurality of groups according to the actual measured grayscale from the high-frequency image of the first captured image, a contour image of the low-frequency image of the second captured image classified into a plurality of groups according to the actual measured grayscale from the low-frequency image of the second captured image, and a contour image of the high-frequency image of the second captured image classified into a plurality of groups according to the actual measured grayscale from the high-frequency image of the second captured image, at the positions of the display panel of the display device; calculate a first similarity index based on the contour image of the low-frequency image of the first captured image and the contour image of the low-frequency image of the second captured image; calculate a second similarity index based on the contour image of the high-frequency image of the first captured image and the contour image of the high-frequency image of the second captured image; and calculate the similarity index based on the first similarity index and the second similarity index.

In an embodiment, the similarity index may be determined using an equation "SI=SI1* m+SI2*(1-m)", where SI is the similarity index, SI1 is the first similarity index, SI2 is the second similarity index, and m is a real number greater than 0 and less than 1.

In an embodiment, the compensation data generating block may be configured to predict a first quality index for a first evaluation data by inputting the first evaluation data different from the reference data and the evaluation data into the compensation prediction model.

An embodiment of a display device may include a display panel including a pixel, a gate driver configured to provide a gate signal to the pixel, a compensation data memory configured to store compensation data, a driving controller configured to compensate for input image data based on the compensation data to generate a data signal, a data driver configured to generate a data voltage based on the data signal to provide the data voltage to the pixel. The compensation data includes a first captured image corresponding to reference data having a reference grayscale, a second captured image corresponding to evaluation data having a compensation target grayscale, a similarity index calculated based on the first captured image and the second captured image, a quality index calculated based on an actual measured grayscale of the second captured image after compensation of the second captured image, and a compensation value determined based on a compensation prediction model generated based on the similarity index and the quality index.

In an embodiment, the quality index may be a ratio of minimum luminance of the actual measured grayscale of the second captured image after the compensation of the second captured image to maximum luminance of the actual measured grayscale of the second captured image after the compensation of the second captured image.

In an embodiment, the compensation prediction model may be generated through linear regression for the similarity index and the quality index.

In an embodiment, the compensation data may not be generated when the similarity index is less than a threshold value, and the compensation data may be generated when the similarity index is greater than the threshold value.

In an embodiment, the first captured image may be filtered into a low-frequency image of the first captured image and a high-frequency image of the first captured image, and the second captured image may be filtered into a low-frequency image of the second captured image and a high-frequency image of the second captured image. A contour image of the low-frequency image of the first captured image classified into a plurality of groups according to an actual measured grayscale from the low-frequency image of the first captured image, a contour image of the high-frequency image of the first captured image classified into a plurality of groups according to the actual measured grayscale from the high-frequency image of the first captured image, a contour image of the low-frequency image of the second captured image classified into a plurality of groups according to the actual measured grayscale from the low-frequency image of the second captured image, and a contour image of the high-frequency image of the second captured image classified into a plurality of groups according to the actual measured grayscale from the high-frequency image of the second captured image may be generated, at the positions of the display panel of the display device. A first similarity index based on the contour image of the low-frequency image of the first captured image and the contour image of the low-frequency image of the second captured image and a second similarity index based on the contour image of the high-frequency image of the first captured image and the contour image of the high-frequency image of the second captured image may be calculated A similarity index based on the first similarity index and the second similarity index may be calculated.

In an embodiment, the similarity index may be determined using an equation "SI=SI1* m+SI2*(1-m)", where SI is the similarity index, SI1 is the first similarity index, SI2 is the second similarity index, and m is a real number greater than 0 and less than 1.

According to the method, the test device, and the display device according to the embodiments, the similarity index may be calculated based on the actual measured grayscale of the first captured image displayed on the display device based on the reference data having the reference grayscale, and the actual measured grayscale of the second captured image displayed on the display device based on the evaluation data having the compensation target grayscale, the quality index may be calculated based on the actual measured grayscale of the second captured image after the compensation of the second captured image, the compensation prediction model may be generated based on the similarity index and the quality index, and the compensation data may be generated based on the first captured image, the second captured image, the similarity index, and the compensation prediction model. Accordingly, the second captured image may be compensated by determining similarity degree between the first captured image and the second captured image, so that quality of the second captured image may be increased after the compensation of the second captured image, and the quality of the second captured image after the compensation of the second captured image may predicted according to the similarity degree.

BRIEF DESCRIPTION OF THE DRAWINGS

The above and other features of embodiments of the present inventive concept will become more apparent by describing in detailed embodiments thereof with reference to the accompanying drawings, in which:

FIG. 2 is a diagram illustrating an example of test data;

FIG. 8 is a diagram illustrating an example of reference data;

FIG. 12 is a diagram illustrating an example of the reference data;

DETAILED DESCRIPTION OF THE EMBODIMENTS

Hereinafter, embodiments of the present inventive concept will be described in detail with reference to the accompanying drawings.

Figure 1:
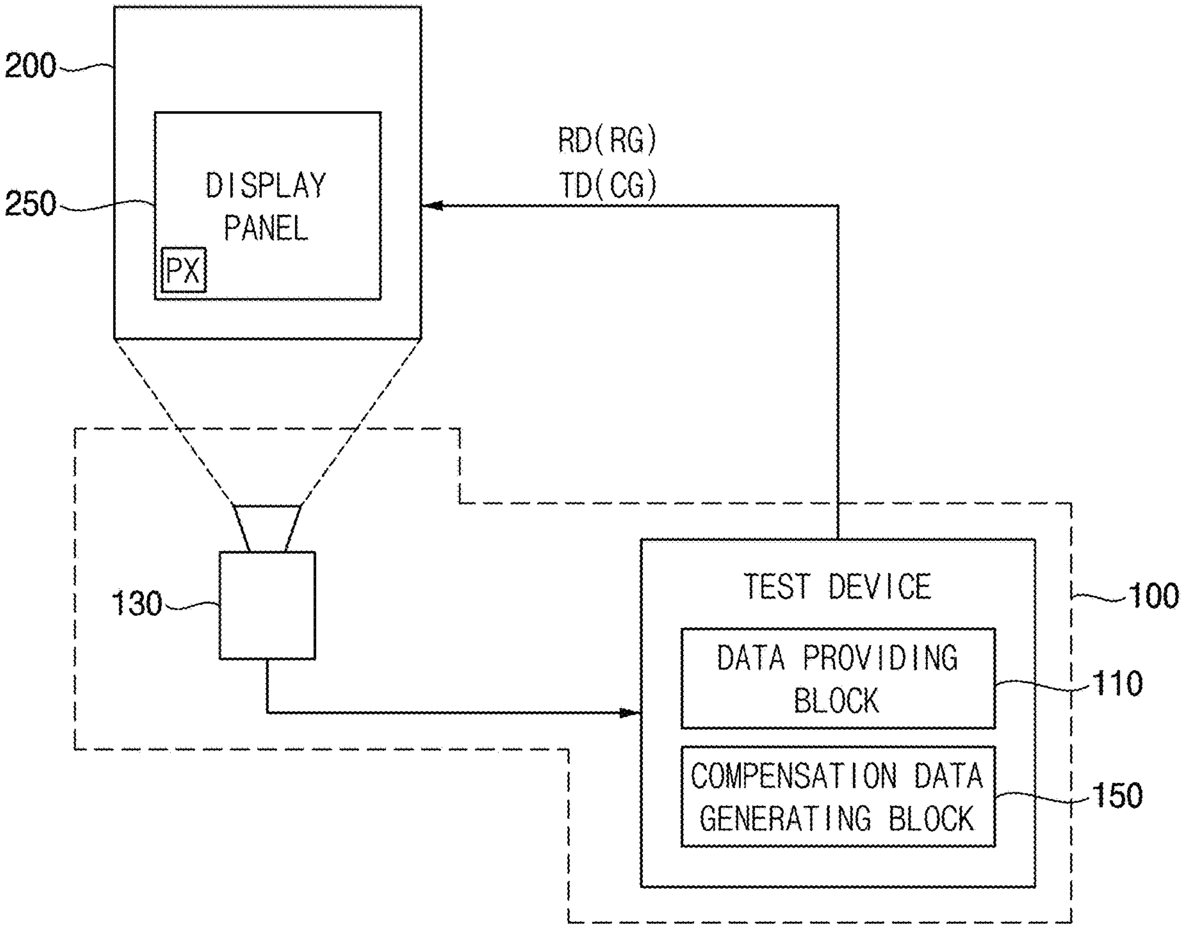
FIG. 1 is a block diagram illustrating a test device generating compensation data for a display device according to embodiments of the present inventive concept.
Figure 3:
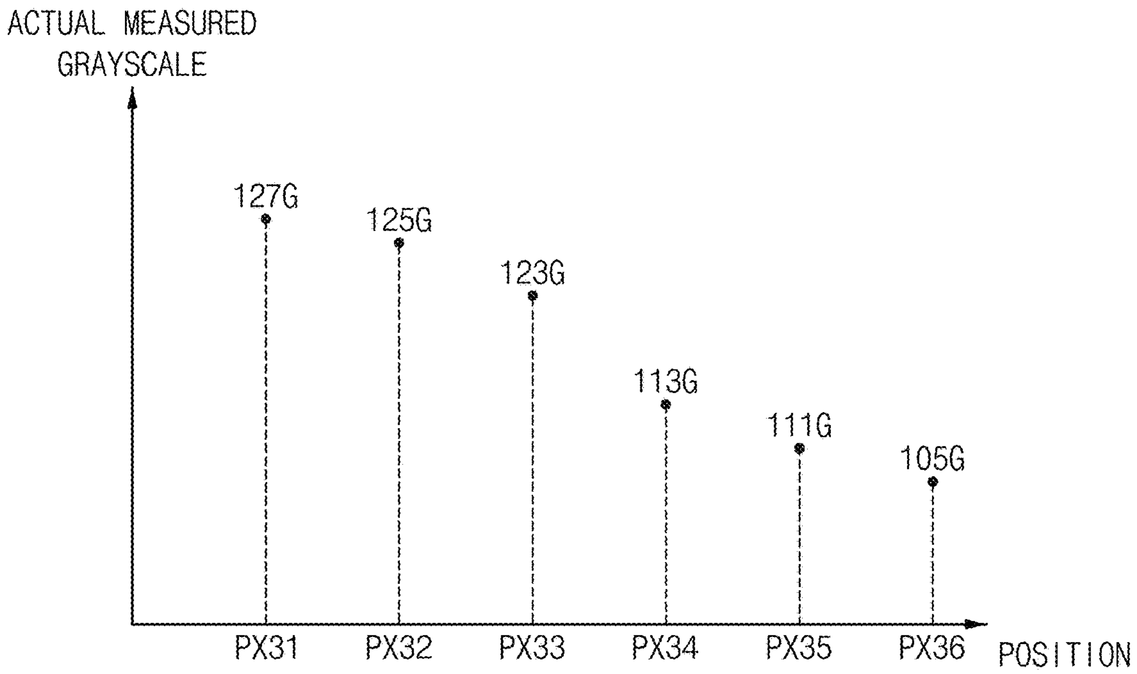
FIG. 3 is a diagram illustrating an example of an actual measured grayscale of a captured image displayed by the display device of FIG. 1 according to the test data of FIG. 2.
Figure 4:
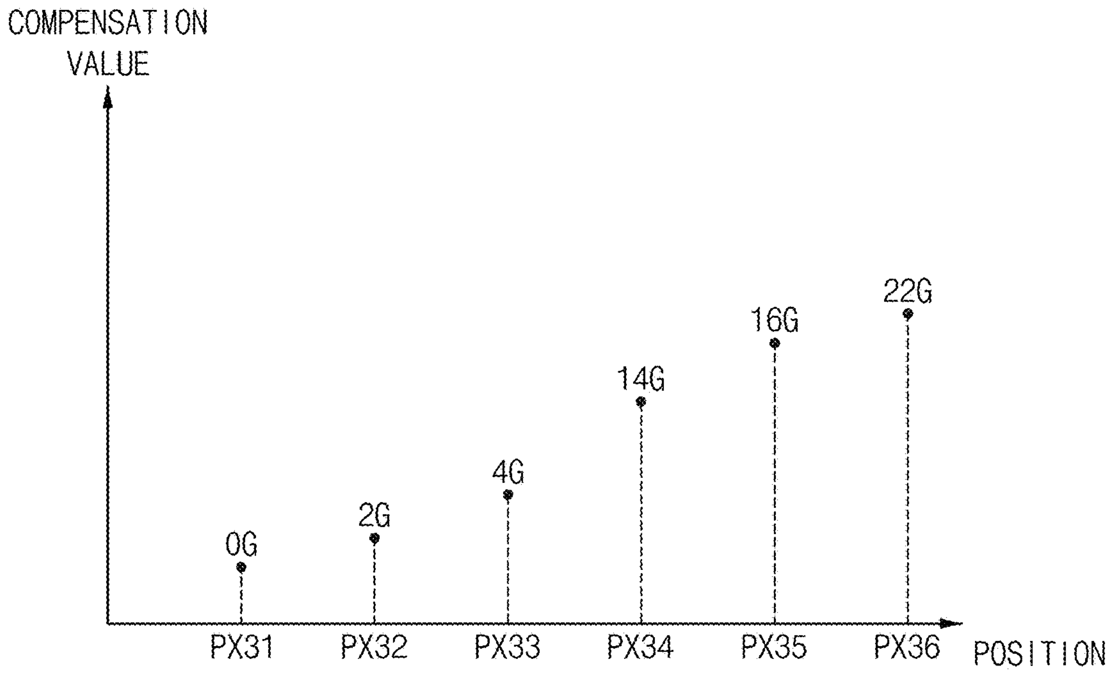
FIG. 4 is a diagram illustrating an example of a compensation value generated based on the test data of FIG. 2.

FIG. 1 is a block diagram illustrating a test device generating compensation data for a display device according to embodiments of the present inventive concept. FIG. 2 is a diagram illustrating an example of test data. FIG. 3 is a diagram illustrating an example of an actual measured grayscale of a captured image displayed by the display device of FIG. 1 according to the test data of FIG. 2. FIG. 4 is a diagram illustrating an example of a compensation value generated based on the test data of FIG. 2.

Referring to FIGS. 1 to 4, a test device 100 according to embodiments of the present inventive concept may generate compensation data for a display device 200. In an embodiment, the test device 100 may perform test process including stain correction on the display device 200. The test device 100 may include a data providing block 110, a camera 130 and a compensation data generating block 150.

The data providing block 110 may provide test data to the display device 200 so that the display device 200 may display an image corresponding to the test data. The test data may include reference data RD and evaluation data TD. The data providing block 110 may be volatile memory or non-volatile memory.

The display panel 250 may include pixels PX. For example, the display panel 250 may include M*N pixels PX (M and N are positive integers greater than or equal to 2).

The reference data RD may be data having a reference grayscale RG. The reference data RD may include the same reference grayscale RG for each of the pixels PX. For example, total grayscales of the display device 200 may include 256 grayscales ranging from 0-grayscale to 255-grayscale, and the reference grayscale RG may include 31-grayscale, 63-grayscale, 95-grayscale, 160-grayscale, and 255-grayscale. But it is not limited thereto.

The evaluation data TD may be data having a compensation target grayscale CG. For example, the compensation target grayscale CG may be equal to the reference grayscale RG or different from the reference grayscale RG. The evaluation data TD may include the same compensation target grayscale CG for each of the M*N pixels PX.

The camera 130 may capture an image displayed on the display device 200 based on the test data. In an embodiment, the camera 130 may be a Charge Coupled Device (CCD)

camera or any other suitable camera. The camera 130 may capture a first captured image displayed on the display device 200 based on the reference data RD having the reference grayscale RG, and capture a second captured image displayed on the display device 200 based on the evaluation data TD having the compensation target grayscale CG.

The compensation data generating block 150 may determine positions of pixels PX included in the display panel 250 corresponding to the first captured image. An actual measured grayscale of the first captured image may be determined according to the determined positions. The compensation data generating block 150 may analyze difference of the actual measured grayscale and the reference grayscale RG at each of the positions of the pixels PX to determine a compensation value. The compensation data generating block 150 may generate compensation data having the compensation value. The compensation data generating block 150 may be an integrated circuit. For example, the compensation data generating block 150 may be implemented in a driving controller of the display device 200.

For example, as shown in FIG. 2, the display panel 250 may include 6*6 pixels PX11 to PX66, and the test data having 127-grayscale 127G may be provided to each of the pixels PX11 to PX66. For example, as shown in FIG. 3, an actual measured grayscale of the 3rd row 1st column pixel PX31 may be 127-grayscale 127G, and an actual measured grayscale of the 3rd row 2nd pixel PX32 may be 125-grayscale 125G, an actual measured grayscale of the 3rd row 3rd column pixel PX33 may be 123-grayscale 123G, an actual measured grayscale of the 3rd row 4th column pixel PX34 may be 113-grayscale 113G, an actual measured grayscale of the 3rd row 5th column pixel PX35 may be 111-grayscale 111G, and an actual measured grayscale of the 3rd row 6th column pixel PX36 may be 105-grayscale 105G. For example, as shown in FIG. 4, a compensation value of the 3rd row 1st column pixel PX31 may be 0-grayscale OG, a compensation value of the 3rd row 2nd column pixel PX32 may be 2-graysclae 2G, a compensation value of the 3rd row 3rd column pixel PX33 may be 4-grayscale 4G, a compensation value of the 3rd row 4th column pixel PX34 may be 14-grayscale 14G, a compensation value of the 3rd row 5th column pixel PX35 may be 16-grayscale 16G, and a compensation value of the 3rd row 6th column pixel PX36 may be 22-grayscale 22G.

The test device 100 may provide the compensation data to the display device 200. For example, the test device 100 may provide the compensation data to a compensation data memory included in the display device 200. The display device 200 may compensate for input image data based on the compensation data stored in the compensation data memory to provide the compensated input image data to the display panel 250. Therefore, the display panel 250 may display an image with stain removed or reduced.

The compensation data generating block 150 may determine the positions of the pixels PX included in the display panel 250 corresponding to the second captured image. An actual measured grayscale of the second captured image may be determined according to the determined positions. The compensation data generating block 150 may analyze difference of the actual measured grayscale of the first captured image and the actual measured grayscale of the second captured image at each of the positions of the pixels PX to determine the compensation value. The compensation data generating block 150 may generate the compensation data having the compensation value.

Figure 5:
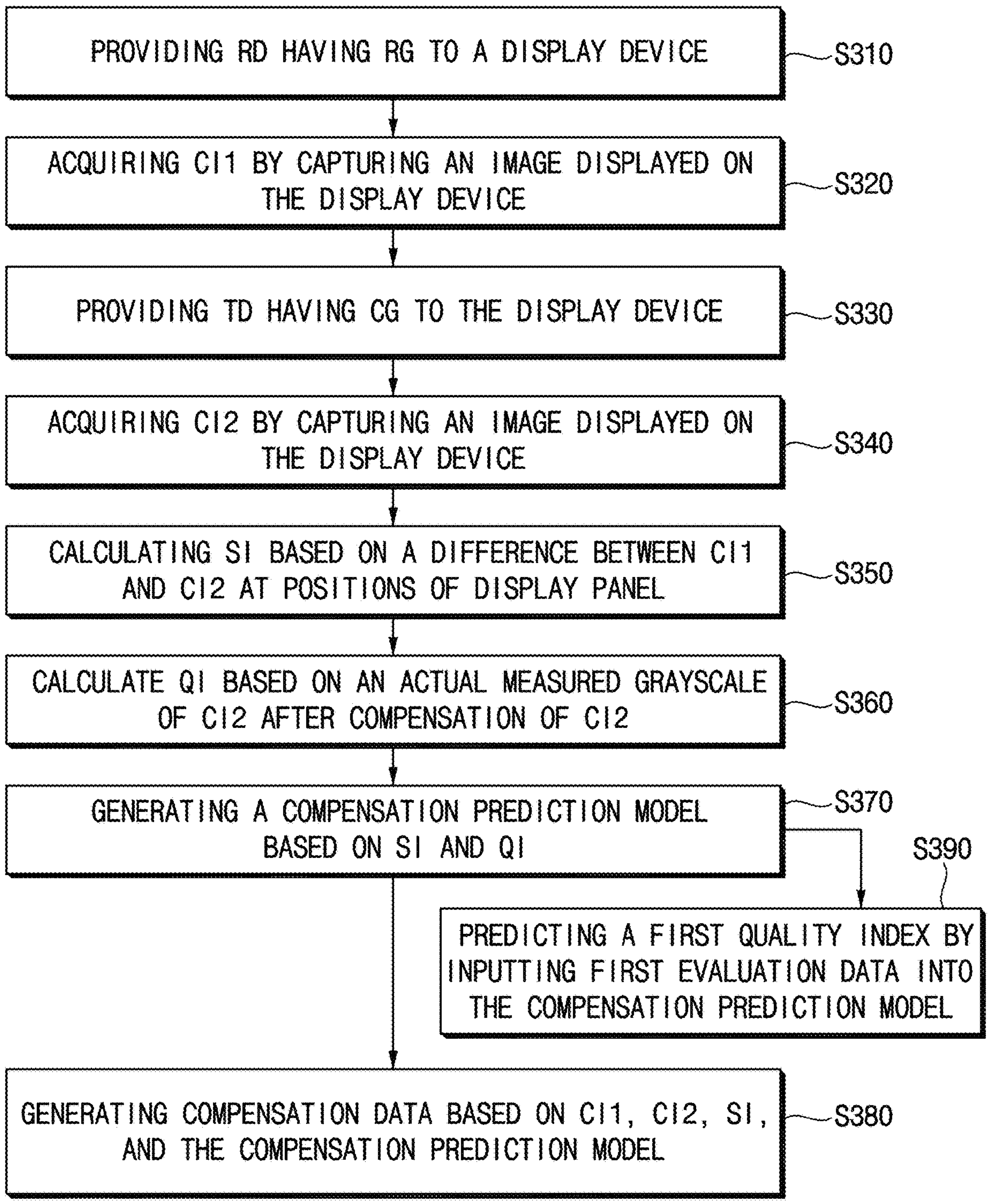
FIG. 5 is a flowchart illustrating a method of generating compensation data for a display device according to embodiments of the present inventive concept.
Figure 6:
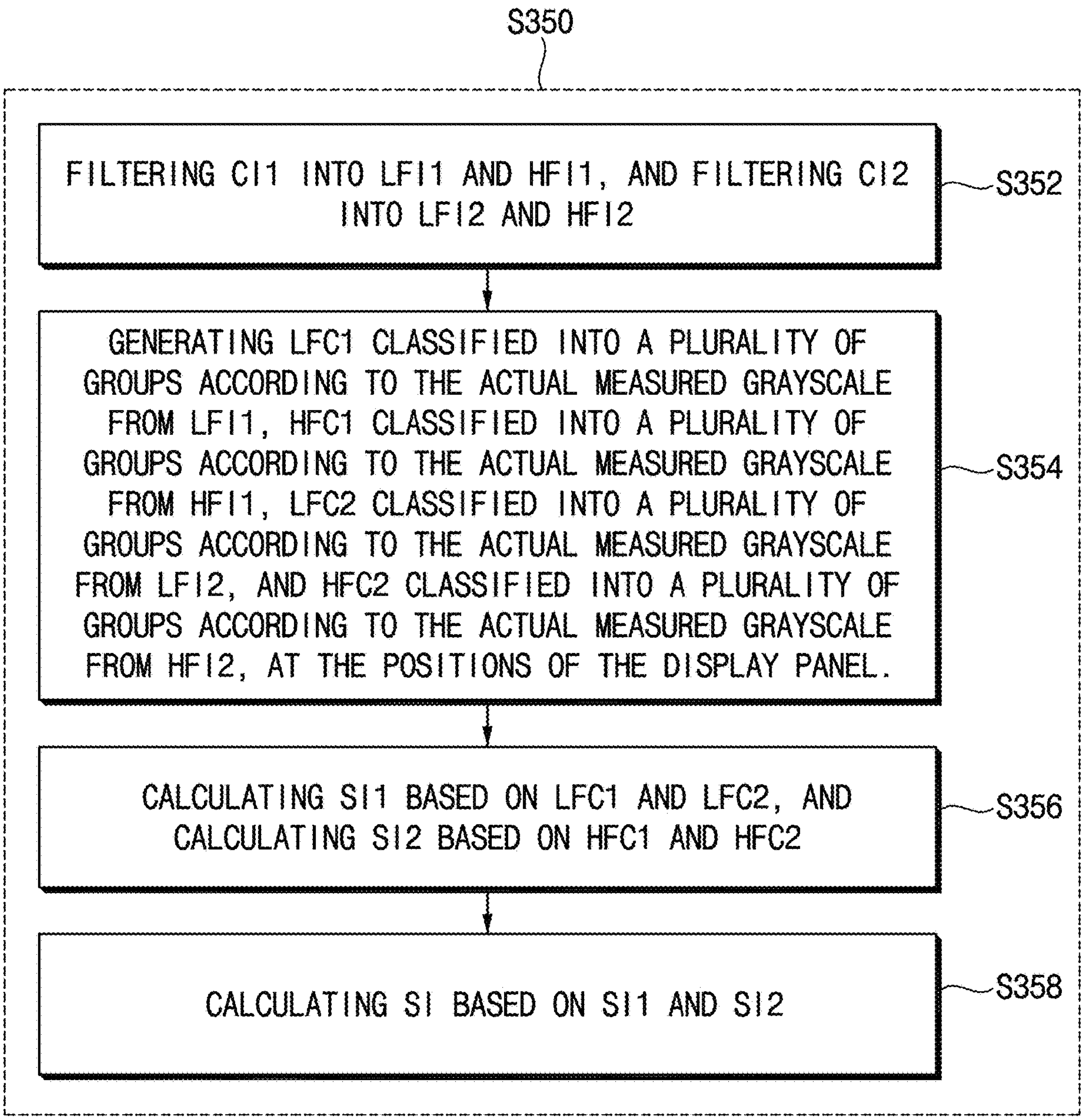
FIG. 6 is a flowchart illustrating calculating a similarity index of FIG. 5.
Figure 7:
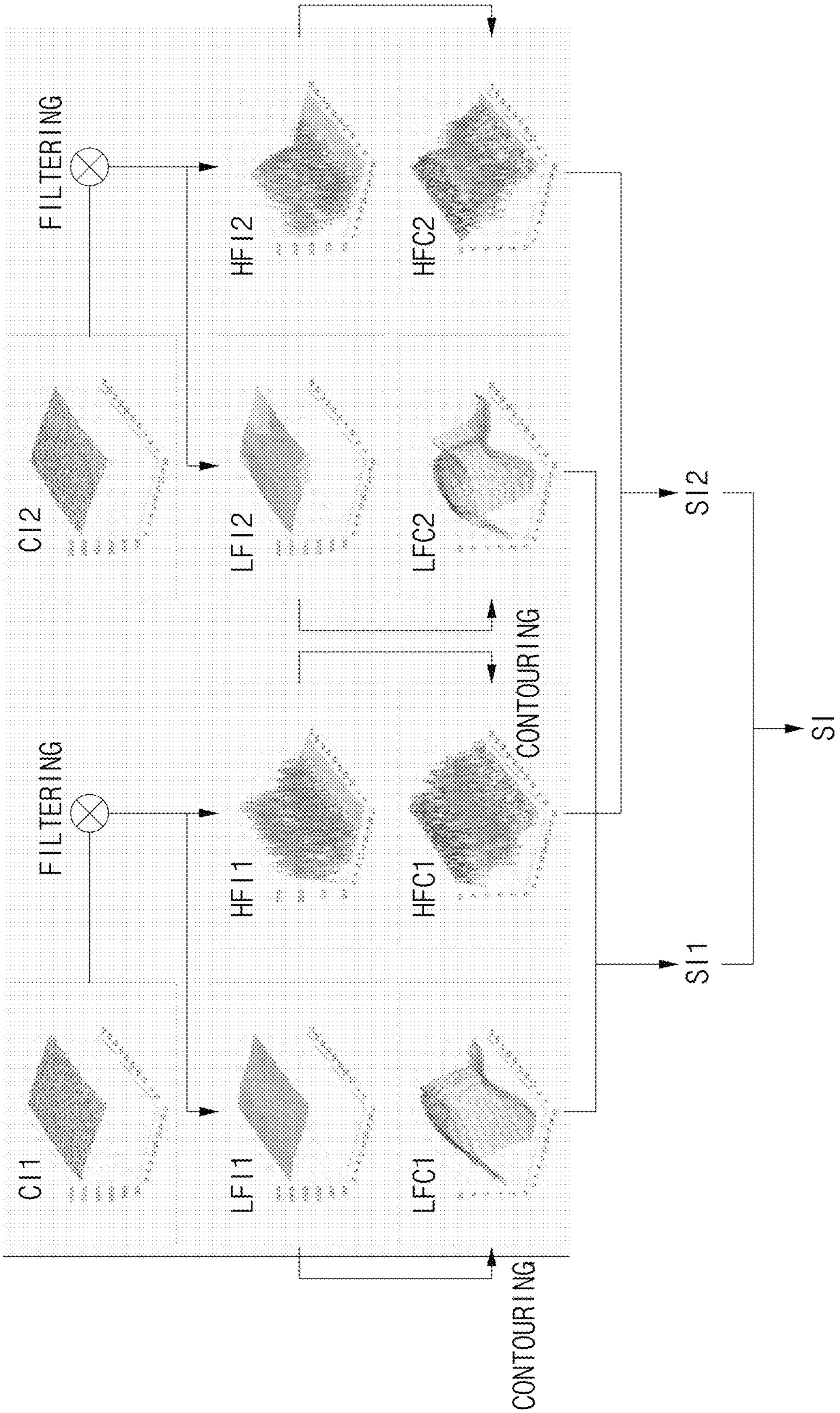
FIG. 7 is a diagram illustrating an example of calculating the similarity index of FIG. 6.
Figure 9:
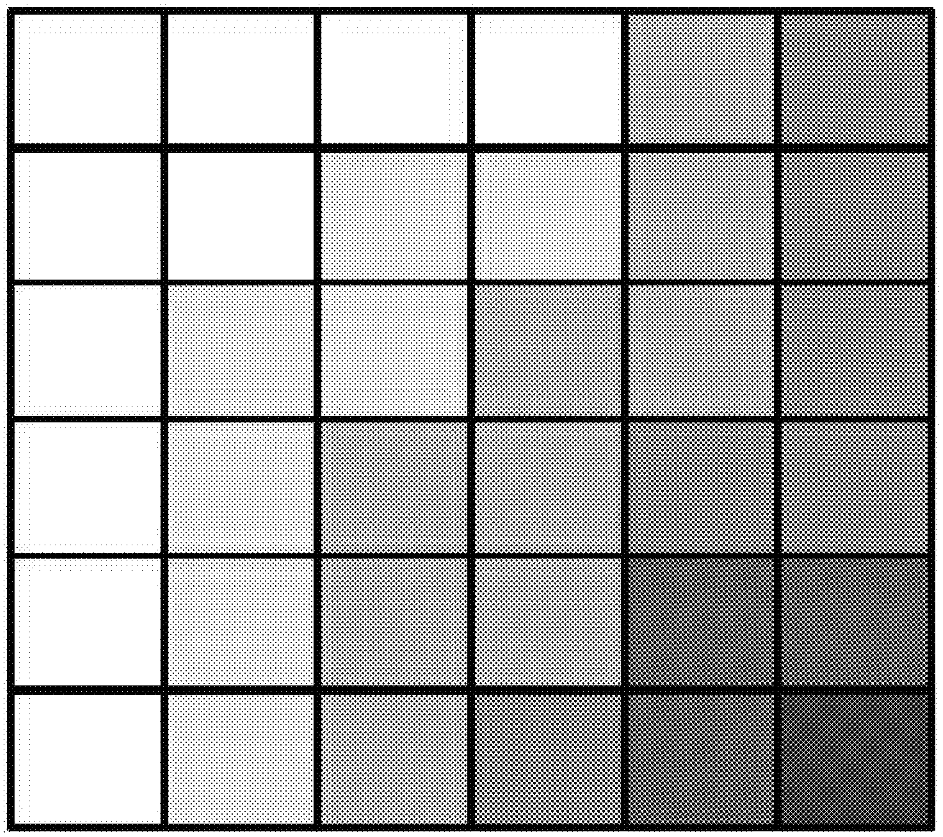
FIG. 9 is a diagram illustrating an example of a first captured image displayed by the display device of FIG. 1 according to the reference data of FIG. 8.
Figure 10:
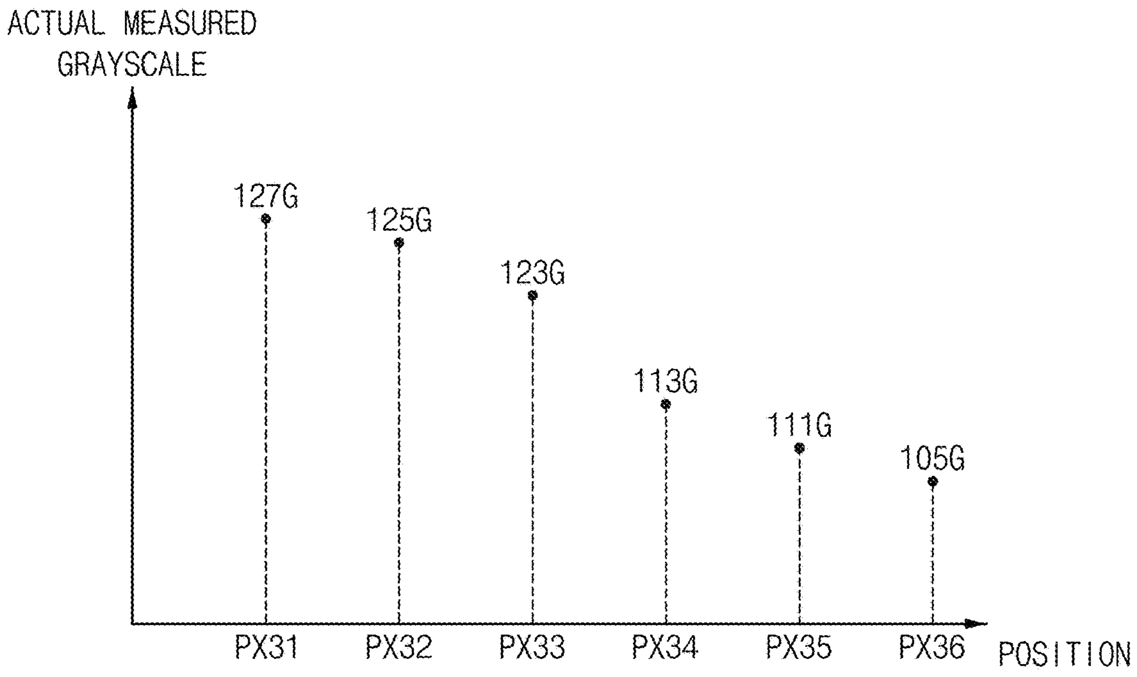
FIG. 10 is a diagram illustrating an example of a low-frequency image of the first captured image of FIG. 9.
Figure 11:
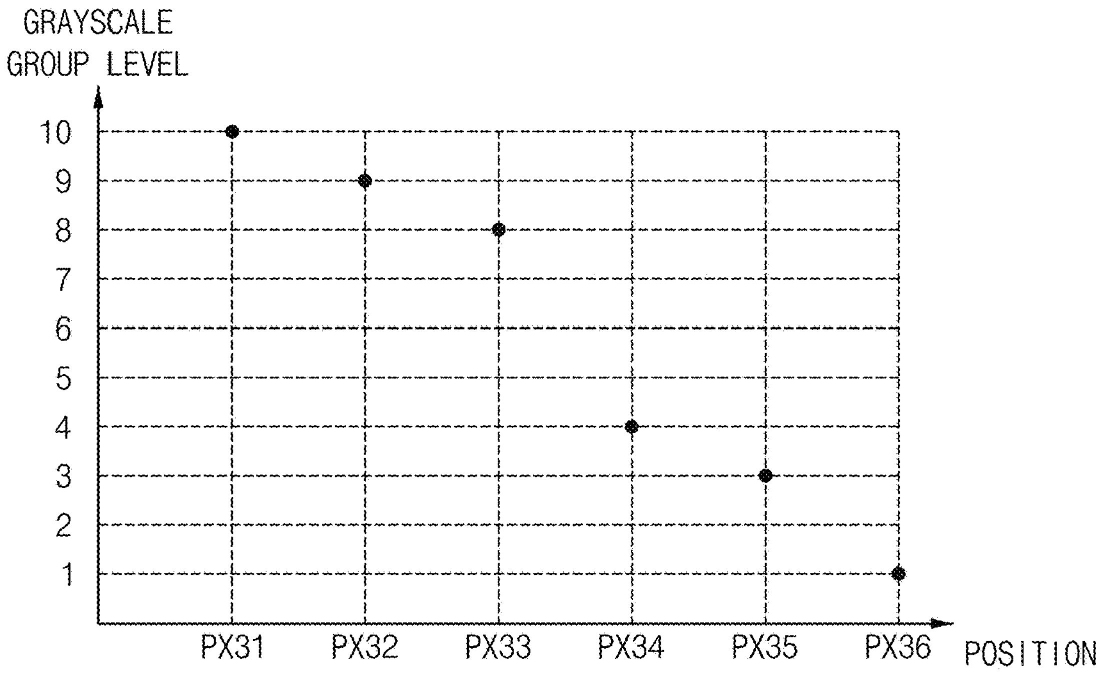
FIG. 11 is a diagram illustrating an example of a contour image of the low-frequency image of the first captured image in which the low-frequency images of the first captured image of FIG. 10 are classified into a plurality of groups according to the actual measured grayscale.
Figure 13:
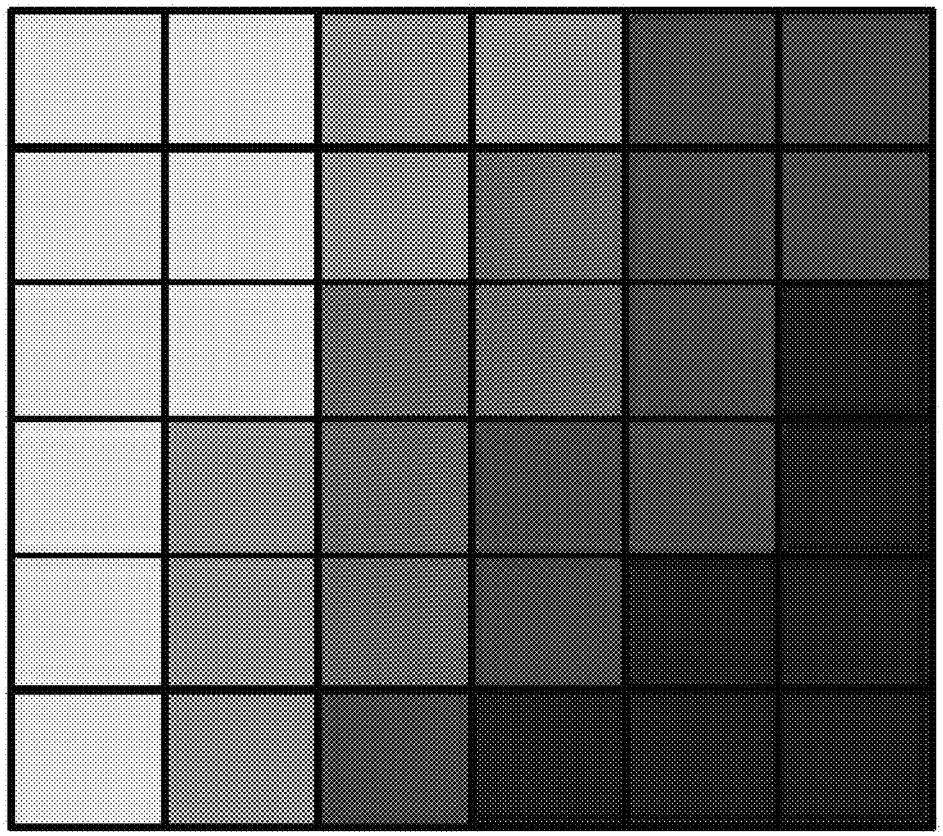
FIG. 13 is a diagram illustrating an example of a second captured image displayed by the display device of FIG. 1 according to the reference data of FIG. 12.
Figure 14:
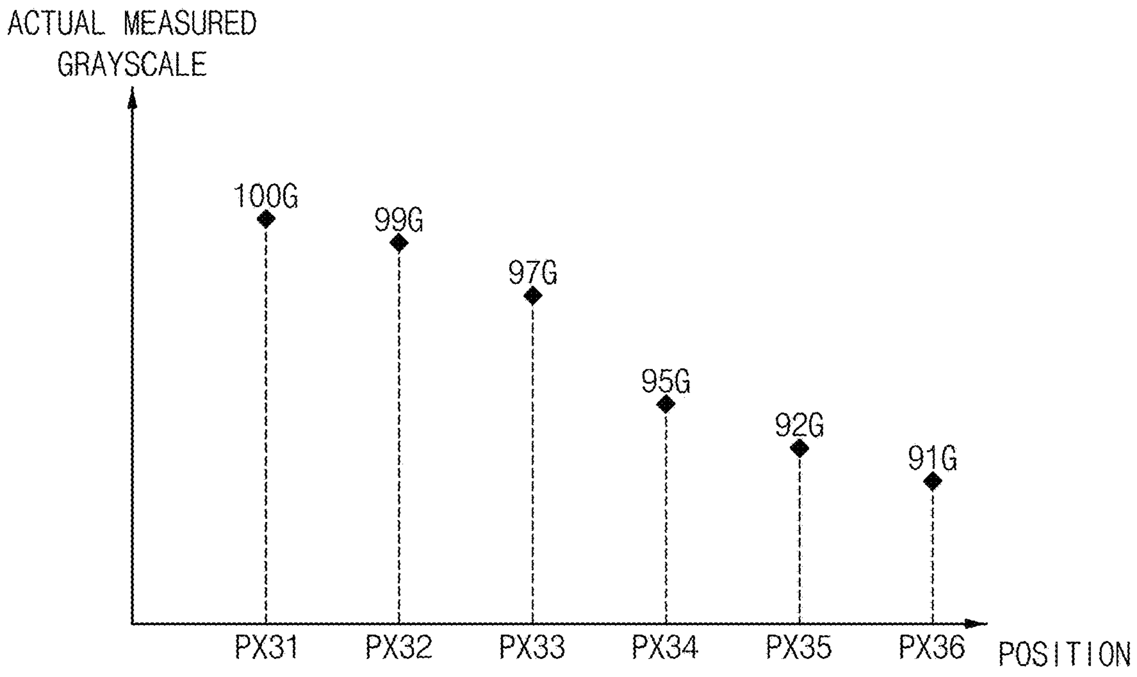
FIG. 14 is a diagram illustrating an example of a low-frequency image of the second captured image of FIG. 13.
Figure 15:
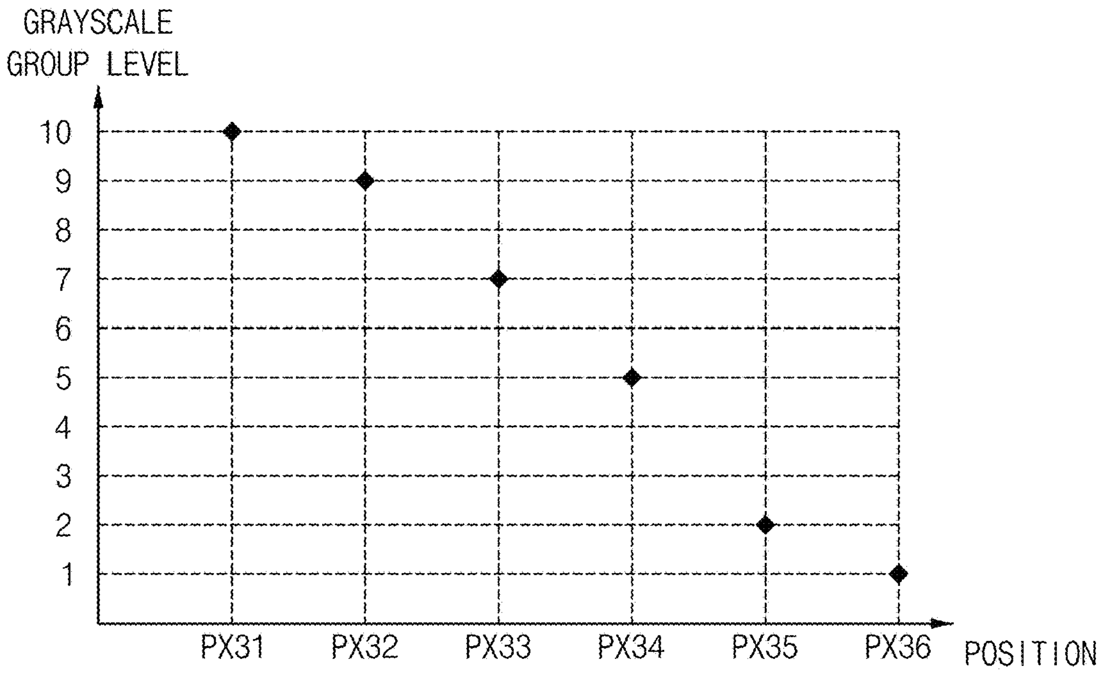
FIG. 15 is a diagram illustrating an example of a contour image of the low-frequency image of the second captured image in which the low-frequency images of the second captured image of FIG. 14 are classified into a plurality of groups according to the actual measured grayscale.
Figure 16:
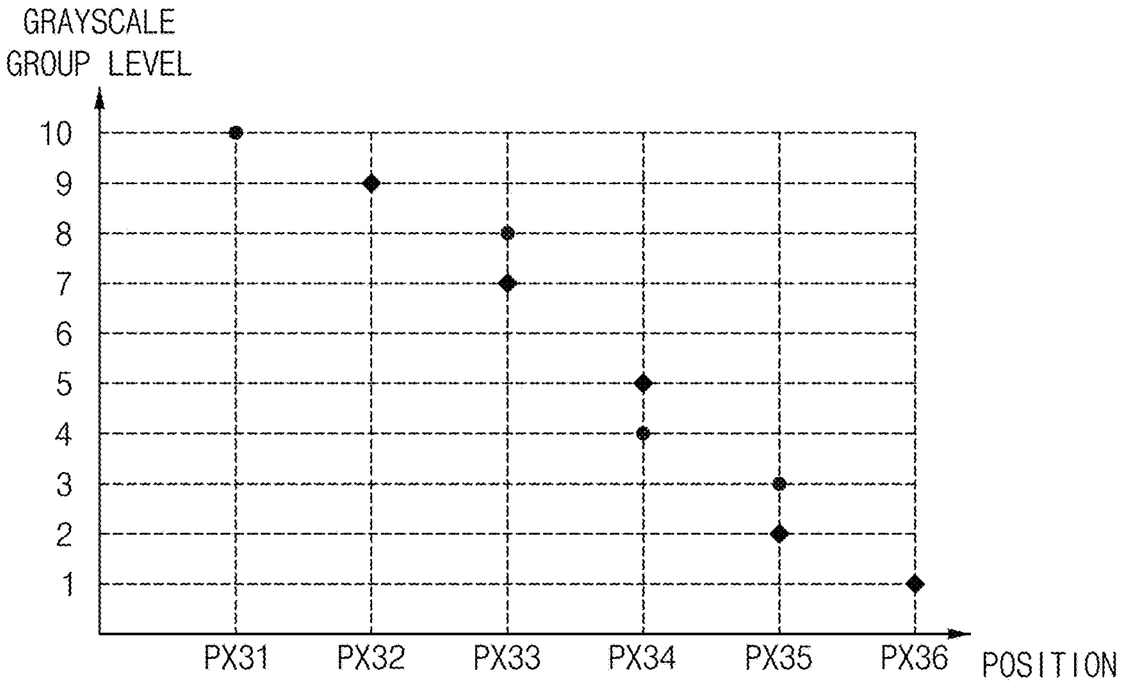
FIG. 16 is a diagram illustrating an example of calculating the similarity index.
Figure 17:
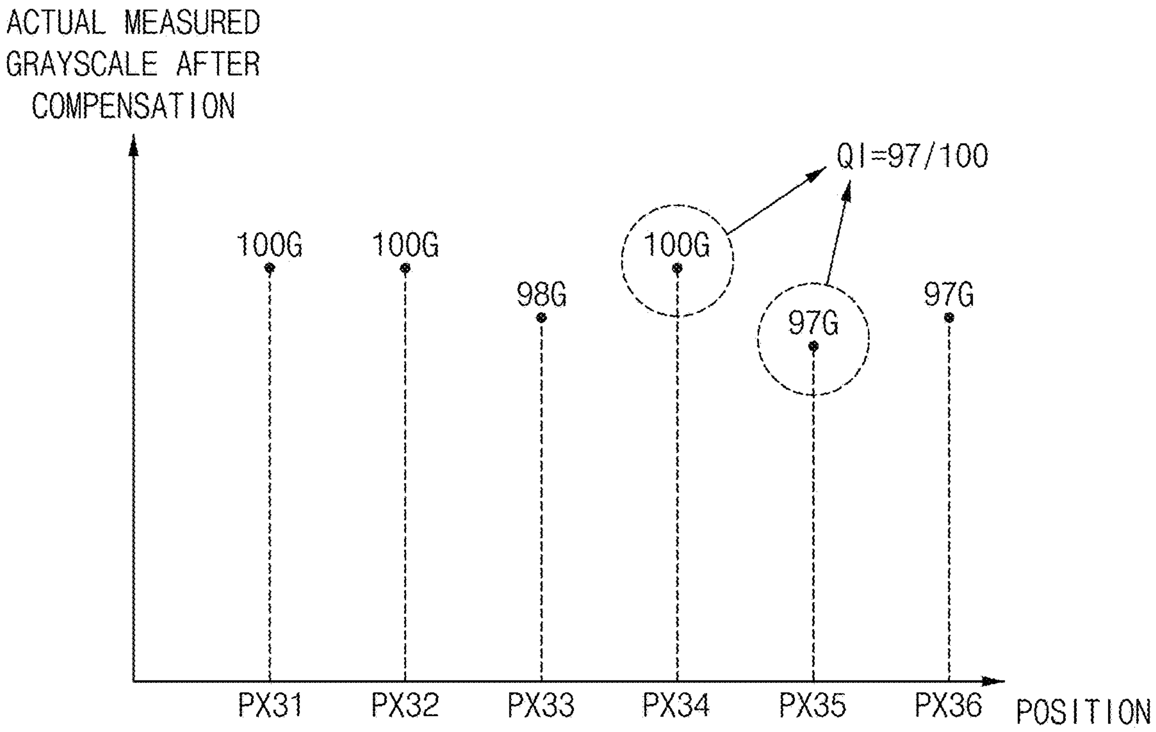
FIG. 17 is a diagram illustrating an example of calculating a quality index.

FIG. 5 is a flowchart illustrating a method of generating compensation data for a display device according to embodiments of the present inventive concept. FIG. 6 is a flowchart illustrating calculating a similarity index of FIG. 5. FIG. 7 is a diagram illustrating an example of calculating the similarity index of FIG. 6. FIG. 8 is a diagram illustrating an example of reference data. FIG. 9 is a diagram illustrating an example of a first captured image displayed by the display device of FIG. 1 according to the reference data of FIG. 8. FIG. 10 is a diagram illustrating an example of a low-frequency image of the first captured image of FIG. 9. FIG. 11 is a diagram illustrating an example of a contour image of the low-frequency image of the first captured image in which the low-frequency images of the first captured image of FIG. 10 are classified into a plurality of groups according to the actual measured grayscale. FIG. 12 is a diagram illustrating an example of the reference data. FIG. 13 is a diagram illustrating an example of a second captured image displayed by the display device of FIG. 1 according to the reference data of FIG. 12. FIG. 14 is a diagram illustrating an example of a low-frequency image of the second captured image of FIG. 13. FIG. 15 is a diagram illustrating an example of a contour image of the low-frequency image of the second captured image in which the low-frequency images of the second captured image of FIG. 14 are classified into a plurality of groups according to the actual measured grayscale. FIG. 16 is a diagram illustrating an example of calculating the similarity index. FIG. 17 is a diagram illustrating an example of calculating a quality index.

Referring to FIGS. 1 to 17, a method of generating compensation data for a display device 200 according to embodiments of the present inventive concept may perform stain correction for the display device 200.

In the method of generating the compensation data, a test device 100 may provide reference data RD having reference grayscale RG to the display device 200 (step S310), acquire a first captured image CI1 by capturing an image displayed on the display device 200 based on the reference data RD having the reference grayscale RG (step S320), provide evaluation data TD having a compensation target grayscale CG to the display device 200 (step S330), and acquire a second captured image CI2 by capturing an image displayed on the display device 200 based on the evaluation data TD having the compensation target grayscale CG (step S340).

For example, as shown in FIG. 8, a display panel 250 may include 6*6 pixels PX11 to PX66, and the reference data RD having 127-grayscale 127G of the reference grayscale RG may be provided to each of the pixels PX11 to PX66. But, as shown in FIG. 9, an actual measured grayscale of the first captured image CI1 at positions of the display panel 250 may be different. For example, as shown in FIG. 12, the display panel 250 may include 6*6 pixels PX11 to PX66, and the evaluation data TD having 100-grayscale of the compensation target grayscale CG may be provided to each of the pixels PX11 to PX66. But, as shown in FIG. 13, an actual measured grayscale of the second captured image CI2 at the positions of the display panel 250 may be different.

The data providing block 150 may calculate a similarity index SI based on a difference between the first captured image CI1 and the second captured image CI2 at the positions of the display panel 250 (step S350).

The compensation data generating block 150 may filter the first captured image CI1 into a low-frequency image LFI1 of the first captured image CI1 and a high-frequency image HFI1 of the first captured image CI1, and filter the second captured image CI2 into a low-frequency image LFI2 of the second captured image CI2 and a high-frequency image HFI2 of the second captured image CI2 (step S352). Specifically, in order to facilitate analysis of the first captured image CI1 and the second captured image CI2 and in order to reduce information loss, the compensation data generating block 150 may filter the first captured image CI1 into the low-frequency image LFI1 of the first captured image CI1 and the high-frequency image HFI1 of the first captured image CI1, and filter the second captured image CI2 into the low-frequency image LFI2 of the second captured image CI2 and the high-frequency image HFI2 of the second captured image CI2.

For example, as shown in FIG. 10, in the low-frequency image LFI1 of the first captured image CI1, an actual measured grayscale of the 3rd row 1st column pixel PX31 may be 127-grayscale 127G, an actual measured grayscale of the 3rd row 2nd column pixel PX32 may be 125-grayscale 125G, an actual measured grayscale of the 3rd row 3rd column pixel PX33 may be 123-grayscale 123G, the 3rd row 4th column pixel PX34 may be 113-grayscale 113G, an actual measured grayscale of the 3rd row 5th column pixel PX35 may be 111-grayscale 111G, and an actual measured grayscale of the 3rd row 6th column pixel PX36 may be 105-grayscale 105G. For example, as shown in FIG. 14, in the low-frequency image LFI2 of the second captured image CI2, an actual measured grayscale of the 3rd row 1st column pixel PX31 may be 100-grayscale 100G, and an actual measured grayscale of the 3rd row 2nd column pixel PX32 may be 99-grayscale 99G, an actual measured grayscale of the 3rd row 3rd column pixel PX33 may be 97-grayscale 97G, an actual measured grayscale of the 3rd row 4th column pixel PX34 may be 95-grayscale 95G, an actual measured grayscale of the 3rd row 5th column pixel PX35 may be 92-grayscale 92G, and an actual measured grayscale of the 3rd row 6th column pixel PX36 may be 91-grayscale 91G.

The compensation data generating block 150 may generate a contour image LFC1 of the low-frequency image LFI1 of the first captured image CI1 classified into a plurality of groups according to the actual measured grayscale from the low-frequency image LFI1 of the first captured image CI1, a contour image HFC1 of the high-frequency image HFI1 of the first captured image CI1 classified into a plurality of groups according to the actual measured grayscale from the high-frequency image HFI1 of the first captured image CI1, a contour image LFC2 of the low-frequency image LFI2 of the second captured image CI2 classified into a plurality of groups according to the actual measured grayscale from the low-frequency image LFI2 of the second captured image CI2, and a contour image HFC2 of the high-frequency image HFI2 of the second captured image CI2 classified into a plurality of groups according to the actual measured grayscale from the high-frequency image HFI2 of the second captured image CI2, at the positions of the display panel 250 (step S354).

For example, when maximum grayscale of the actual measured grayscale of the low-frequency image LFI1 of the first captured image CI1 is 127-grayscale and minimum grayscale of the actual measured grayscale of the low-frequency image LFI1 of the first captured image CI1 is 105-grayscale, the compensation data generating block 150 may classify the low-frequency image LFI1 of the first captured image CI1 into the groups according to the actual measured grayscale, and as shown in FIG. 11, in the contour image LFC1 of the low-frequency image LFI1 of the first captured image CI1, grayscale group level of the 3rd row 1st column pixel PX31 may be 10, grayscale group level of the 3rd row 2nd column pixels PX32 may be 9, and grayscale group level of the 3rd row 3rd column pixel PX33 may be 8, grayscale group level of the 3rd row 4th column pixel PX34 may be 4, grayscale group level of the 3rd row 5th column pixel PX35 may be 3, and grayscale group level of the 3rd row 6th column pixel PX36 may be 1. For example, when maximum grayscale of the actual measured grayscale of the low-frequency image LFI2 of the second captured image CI2 is 100-grayscale and minimum grayscale of the actual measured grayscale of the low-frequency image LFI2 of the second captured image CI2 is 91-grayscale, the compensation data generating block 150 may classify the low-frequency image LFI2 of the second captured image CI2 into the groups according to the actual measured grayscale, and as shown in FIG. 15, in the contour image LFC2 of the low-frequency image LFI2 of the second captured image CI2, grayscale group level of the 3rd row 1st column pixel PX31 may be 10, grayscale group level of the 3rd row 2nd column pixel PX32 may be 9, grayscale group level of the 3rd row 3rd column pixel PX33 may be 7, grayscale group level of the 3rd row 4th column pixel PX34 may be 5, grayscale group level of the 3rd row 5th column pixel PX35 may be 2, and grayscale group level of the 3rd row 6th column pixel PX36 may be 1.

The compensation data generating block 150 may calculate a first similarity index SI1 based on the contour image LFC1 of the low-frequency image LFI1 of the first captured image CI1 and the contour image LFC2 of the low-frequency image LFI2 of the second captured image CI2, and calculate a second similarity index SI2 based on the contour image HFC1 of the high-frequency image HFI1 of the first captured image CI1 and the contour image HFC2 of the high-frequency image HFI2 of the second captured image CI2 (step S356).

As shown in FIG. 16, the compensation data generating block 150 may analyze difference between the grayscale group level of the contour image LFC1 of the low-frequency image LFI1 of the first captured image CI1 and the grayscale group level of the contour image LFC2 of the low-frequency image LFI2 of the second captured image CI2 at the positions of the display panel 250 to calculate the similarity index SI1. Specifically, as the difference between the grayscale group level of the contour image LFC1 of the low-frequency image LFI1 of the first captured image CI1 and the grayscale group level of the contour image LFC2 of the low-frequency image LFI2 of the second captured image CI2 is small, the first similarity index SI1 may be large, and as the difference between the grayscale group level of the contour image LFC1 of the low-frequency image LFI1 of the first captured image CI1 and the grayscale group level of the contour image LFC2 of the low-frequency image LFI2 of the second captured image CI2 is large, the first similarity index SI1 may be small.

The compensation data generating block 150 may calculate the similarity index SI based on the first similarity index SI1 and the second similarity index SI2 (step S358). The similarity index SI may be determined using an equation "SI=SI1*m+SI2*(1-m)". Here, SI is the similarity index, SI1 is the first similarity index, and SI2 is the second similarity index, and m is a real number greater than 0 and less than 1. When a weight of the first similarity index SI1 and a weight of the second similarity index SI2 are the same, m may be 0.5. When the weight of the first similarity index SI1 is greater than the weight of the second similarity index SI2, m may be greater than 0.5. When the weight of the first similarity index SI1 is less than the weight of the second similarity index SI2, m may be less than 0.5.

The compensation data generating block 150 may calculate a quality index QI based on an actual measured grayscale of the second captured image CI2 after compensation of the second captured image CI2 (step S360).

As described with reference to FIGS. 3 and 4, the compensation data generating block 150 may analyze difference between the reference grayscale RG and the actual measured grayscale of the first captured image CI1 for the reference grayscale at each of the positions of the pixels PX to determine a compensation value of the first captured image CI1. The compensation data generating block 150 may compare the actual measured grayscale of the second captured image CI2 for the compensation target grayscale CG with the actual measured grayscale of the first captured image CI1 for the reference grayscale RG at each of the positions of the display panel 250 to determine a compensation value of the second captured image CI2 based on the compensation value of the first captured image CI1. Therefore, as the actual measured grayscale of the first captured image CI1 is similar to the actual measured grayscale of the second captured image CI2 at each of the positions of the pixels PX, quality after compensation of the second captured image CI2 may be enhanced.

The quality index QI may be an index representing quality of after compensation of the evaluation data TD. The quality index QI may be a ratio of a minimum grayscale of an actual measured grayscale after the compensation of the second captured image CI2 to a maximum grayscale of the actual measured grayscale of the second captured image CI2 after the compensation of the second captured image CI2. For example, as shown in FIG. 17, the maximum grayscale of the actual measured grayscale of the second captured image CI2 after the compensation of the second captured image CI2 may be 100-grayscale 100G, and the minimum grayscale of the actual measured grayscale of the second captured image CI2 after the compensation of the second captured image CI2 may be 97-grayscale 97G, and thus, the quality index QI of the second captured image CI2 may be 0.97.

The compensation data generating block 150 may generate a compensation prediction model based on the similarity index SI and the quality index QI (step S370). The compensation prediction model may be generated through linear regression for the similarity index SI and the quality index QI. Alternatively, the compensation prediction model may be generated through polynomial regression on the similarity index SI and the quality index QI.

The compensation data generating block 150 may compare the similarity index SI with a threshold value. When the similarity index SI is less than the threshold value, the compensation data generating block 150 may not generate the compensation data, and when the similarity index SI is greater than the threshold value, the compensation data generating block 150 may generate the compensation data. The threshold value may be a value serving as a criterion for determining whether to generate the compensation data based on the similarity index SI. Since the first captured image CI1 and the second captured image CI2 are similar as the similarity index SI increases, the quality index QI of the second captured image CI2 may increase. On the other hand, since the first captured image CI1 and the second captured image CI2 are dissimilar as the similarity index SI decreases, the quality index QI of the second captured image CI2 may decrease.

The compensation data generating block 150 may generate the compensation data based on the first captured image CI1, the second captured image CI2, the similarity index SI, and the compensation prediction model (step S380).

The compensation data generating block 150 may predict a first quality index for a first evaluation data by inputting the first evaluation data different from the reference data RD and the evaluation data TD into the compensation prediction model (step S390).

The compensation data generating block 150 may predict the quality index QI by inputting the similarity index SI to the compensation prediction model before compensation of the first evaluation data is performed.

Reliability of the compensation prediction model may be determined based on a coefficient of determination (r-square). The coefficient of determination may be determined based on the similarity index SI, the quality index QI, and the compensation prediction model.

Figure 18:
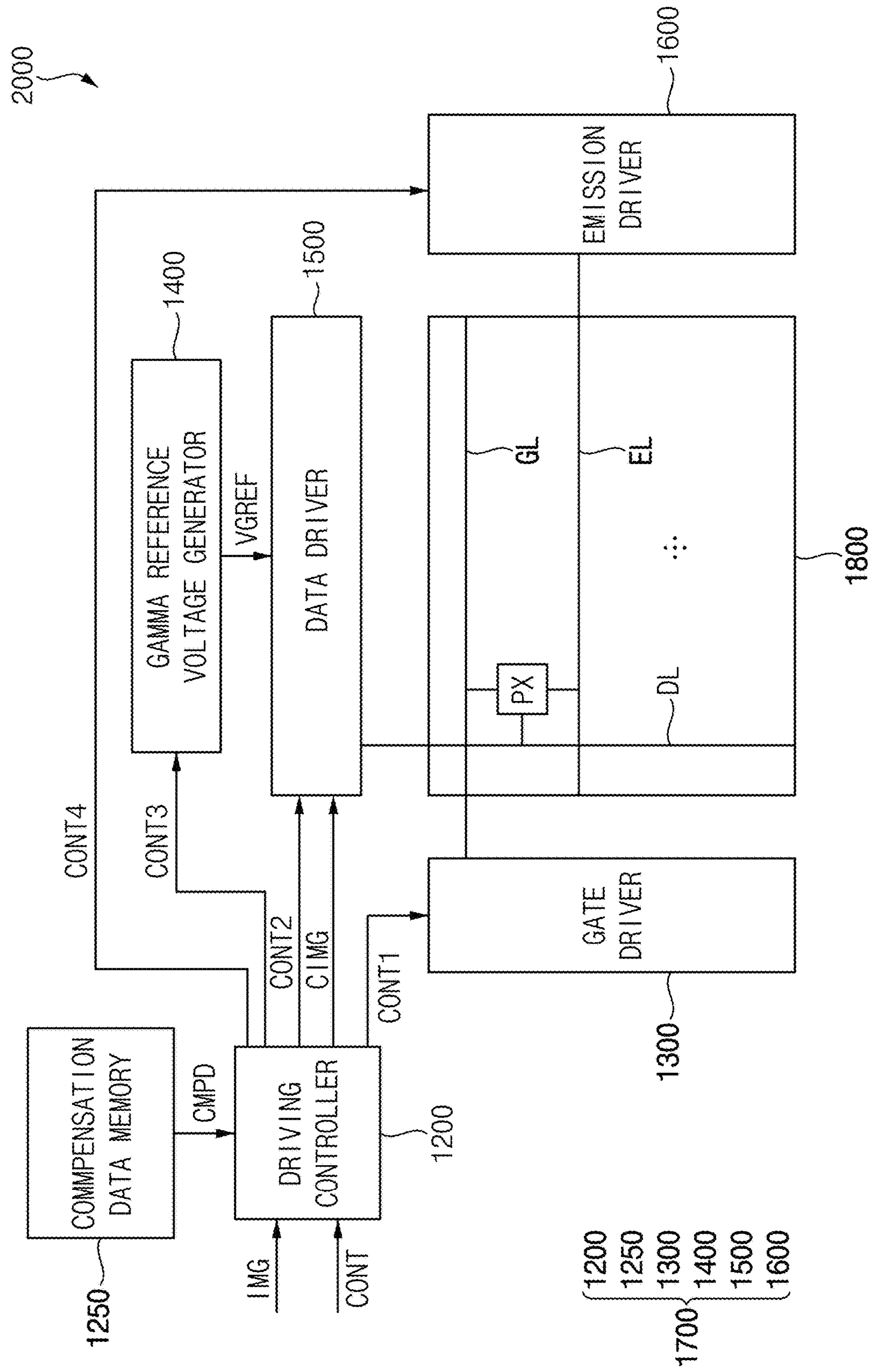
FIG. 18 is a block diagram illustrating the display device according to embodiments of the present inventive concept.

FIG. 18 is a block diagram illustrating the display device according to embodiments of the present inventive concept.

Referring to FIGS. 1 to 18, a display device 2000 may include a display panel 1800 and a display panel driver 1700. The display panel driver 1700 may include a driving controller 1200, a gate driver 1300, a gamma reference voltage generator 1400, a data driver 1500, an emission driver 1600, and a compensation data memory 1250.

For example, the driving controller 1200 and the data driver 1500 may be integrally formed. For example, the driving controller 1200, the gamma reference voltage generator 1400, and the data driver 1500 may be integrally formed. For example, the driving controller 1200, the gate driver 1300, the gamma reference voltage generator 1400, and the data driver 1500 may be integrally formed. For example, the driving controller 1200, the grate driver 1300, the gamma reference voltage generator 1400, the data driver 1500, and the emission driver 1600 may be integrally formed. A driving module including at least the driving controller 1200 and the data driver 1500 which are integrally formed may be referred to as a timing controller embedded data driver (TED).

The display panel 1800 may include a display region displaying an image and a peripheral region disposed adjacent to the display region.

For example, the display panel 1800 may be an organic light emitting diode display panel including organic light emitting diodes. For example, the display panel 1800 may be a quantum-dot organic light emitting diode display panel including organic light emitting diodes and quantum-dot color filters. For example, the display panel 1800 may be a quantum-dot nano light emitting diode display panel including nano light emitting diodes and quantum-dot color filters.

The display panel 1800 may include gate lines GL, data lines DL, emission lines EL, and pixels PX electrically connected to the gate lines GL, the data lines DL, and the emission lines EL.

The driving controller 200 may receive input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 1200 may generate a first control signal CONT1, a second control signal CONT2, a third control signal CONT3, a fourth control signal CONT4, and a compensated image data CIMG based on the input image data IMG and the input control signal CONT.

The driving controller 1200 may generate the first control signal CONT1 for controlling an operation of the gate driver 1300 based on the input control signal CONT, and output the first control signal CONT1 to the gate driver 1300. The first control signal CONT1 may include a vertical start signal and a gate clock signal.

The driving controller 1200 may generate the second control signal CONT2 for controlling an operation of the data driver 1500 based on the input control signal CONT, and output the second control signal CONT2 to the data driver 1500. The second control signal CONT2 may include a horizontal start signal and a load signal.

The driving controller 1200 may generate the compensated image data CIMG based on the input image data IMG. The driving controller 200 may output the compensated image data CIMG to the data driver 1500.

The driving controller 1200 may generate the third control signal CONT3 for controlling an operation of the gamma reference voltage generator 1400 based on the input control signal CONT, and output the third control signal CONT3 to the gamma reference voltage generator 1400.

The driving controller 1200 may generate the fourth control signal CONT4 for controlling an operation of the emission driver 1600 based on the input control signal CONT, and output the third control signal CONT4 to the emission driver 1600.

The compensation data memory 1250 may store compensation data CMPD having a compensation value determined based on a first captured image CI1, a second captured image CI2, and a similarity index. However, this is an example, and the compensation data memory 1250 is not limited thereto. For example, the compensation data memory 1250 may be included in the driving controller 1200.

The gate driver 1300 may generate gate signals for driving the gate lines GL in response to the first control signal CONT1 received from the driving controller 1200. The gate driver 1300 may output the gate signals to the gate lines GL.

In an embodiment, the gate driver 1300 may be integrated on the peripheral region of the display panel 1800.

The gamma reference voltage generator 1400 may generate a gamma reference voltage VGREF in response to the third control signal CONT3 received from the driving controller 1200. The gamma reference voltage generator 1400 may provide the gamma reference voltage VGREF to the data driver 1500. The gamma reference voltage VGREF may have a value corresponding to each compensated image data CIMG.

In an embodiment, the gamma reference voltage generator 1400 may be disposed in the driving controller 1200 or in the data driver 1500.

The data driver 1500 may receive the second control signal CONT2 and the compensated image data CIMG from the driving controller 1200, and receive the gamma reference voltage VGREF from the gamma reference voltage generator 1400. The data driver 1500 may convert the compensated image data CIMG into a data voltage in analog form using the gamma reference voltage VGREF. The data driver 1500 may output the data voltage to the data line DL.

The emission driver 1600 may generate emission signals for driving the emission lines EL in response to the fourth control signal CONT4 received from the driving controller 1200. The emission driver 1600 may output the emission signals to the emission lines EL.

FIG. 18 shows that the gate driver 1300 is disposed on a first side of the display panel 1800 and the emission driver 1600 is disposed on a second side of the display panel 1800 for convenience of description. The present inventive concept is not limited to this. For example, both the gate driver1 1300 and the emission driver 1600 may be disposed on the first side of the display panel 1800. For example, the gate driver 1300 and the emission driver 1600 may be integrally formed.

Figure 19:
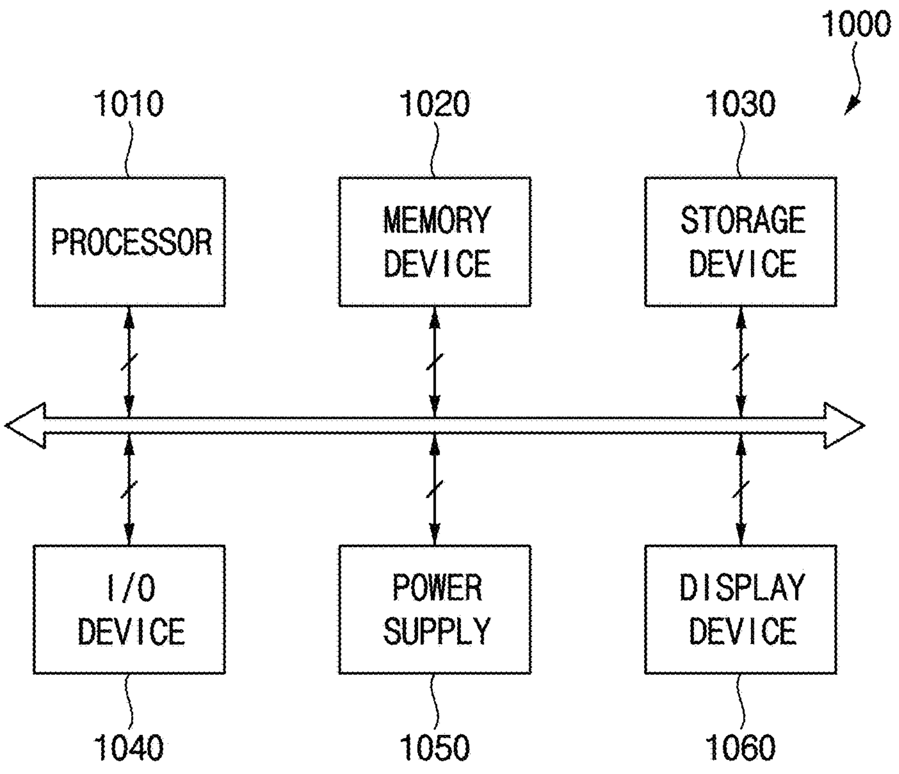
FIG. 19 is a block diagram illustrating an electronic device.
Figure 20:
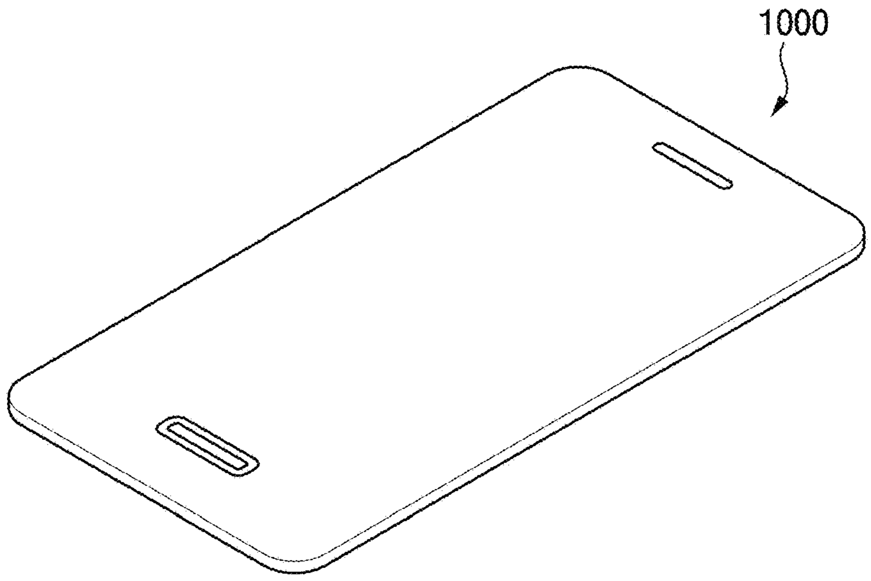
FIG. 20 is a diagram illustrating an embodiment in which the electronic device of FIG. 19 is implemented as a smart phone.

FIG. 19 is a block diagram illustrating an electronic device. FIG. 20 is a diagram illustrating an embodiment in which the electronic device of FIG. 19 is implemented as a smart phone.

Referring to FIGS. 19 and 20, an electronic device 1000 may include a processor 1010, a memory device 1020, a storage device 1030, an input/output (I/O) device 1040, a power supply 1050, and a display device 1060. The display device 1060 may be the display device 200 in FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 20, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel.

For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including a pixel;

a gate driver configured to provide a gate signal to the pixel;

a compensation data memory configured to store compensation data;

a driving controller configured to compensate for input image data based on the compensation data to generate a data signal;

a data driver configured to generate a data voltage based on the data signal to provide the data voltage to the pixel;

wherein the compensation data include a first captured image corresponding to reference data having a reference grayscale, a second captured image corresponding to evaluation data having a compensation target grayscale, a similarity index calculated based on the first captured image and the second captured image, a quality index calculated based on an actual measured grayscale of the second captured image after compensation of the second captured image, and a compensation value determined based on a compensation prediction model generated based on the similarity index and the quality index.

2. The display device of claim 1, wherein the quality index is a ratio of minimum luminance of the actual measured grayscale of the second captured image after the compensation of the second captured image to maximum luminance of the actual measured grayscale of the second captured image after the compensation of the second captured image.

3. The display device of claim 1, wherein the compensation prediction model is generated through linear regression for the similarity index and the quality index.

4. The display device of claim 1, wherein the compensation data is not generated when the similarity index is less than a threshold value, and the compensation data is generated when the similarity index is greater than the threshold value.

5. The display device of claim 1, wherein the first captured image is filtered into a low-frequency image of the first captured image and a high-frequency image of the first captured image, and the second captured image is filtered into a low-frequency image of the second captured image and a high-frequency image of the second captured image, wherein a contour image of the low-frequency image of the first captured image classified into a plurality of groups according to an actual measured grayscale from the low-frequency image of the first captured image, a contour image of the high-frequency image of the first captured image classified into a plurality of groups according to the actual measured grayscale from the high-frequency image of the first captured image, a contour image of the low-frequency image of the second captured image classified into a plurality of groups according to the actual measured grayscale from the low-frequency image of the second captured image, and a contour image of the high-frequency image of the second captured image classified into a plurality of groups according to the actual measured grayscale from the high-frequency image of the second captured image are generated, at the positions of the display panel of the display device;

wherein a first similarity index based on the contour image of the low-frequency image of the first captured image and the contour image of the low-frequency image of the second captured image and a second similarity index based on the contour image of the high-frequency image of the first captured image and the contour image of the high-frequency image of the second captured image are calculated, and wherein a similarity index based on the first similarity index and the second similarity index is calculated.

6. The display device of claim 5, wherein the similarity index is determined using an equation "SI=SI1*m+SI2*(1-m)", where SI is the similarity index, SI1 is the first similarity index, SI2 is the second similarity index, and m is a real number greater than 0 and less than 1.

7. A method of generating compensation data for a display device, the method comprising:

acquiring a first captured image by capturing an image displayed on the display device based on reference data having a reference grayscale;

acquiring a second captured image by capturing an image displayed on the display device based on evaluation data having a compensation target grayscale;

calculating a similarity index based on a difference between the first captured image and the second captured image at a plurality of positions of a display panel of the display device;

calculating a quality index based on an actual measured grayscale of the second captured image after compensation of the second captured image;

generating a compensation prediction model based on the similarity index and the quality index; and generating the compensation data based on the first captured image, the second captured image, the similarity index, and the compensation prediction model.

8. The method of claim 7, wherein the quality index is a ratio of minimum luminance of the actual measured grayscale of the second captured image after the compensation of the second captured image to maximum luminance of the actual measured grayscale of the second captured image after the compensation of the second captured image.

9. The method of claim 7, wherein the compensation prediction model is generated through linear regression for the similarity index and the quality index.

10. The method of claim 7, wherein the compensation data is generated when the similarity index is greater than a threshold value.

11. The method of claim 7, wherein calculating the similarity index includes, filtering the first captured image into a low-frequency image of the first captured image and a high-frequency image of the first captured image, and filtering the second captured image into a low-frequency image of the second captured image and a high-frequency image of the second captured image;

generating a contour image of the low-frequency image of the first captured image classified into a plurality of groups according to an actual measured grayscale from the low-frequency image of the first captured image, a contour image of the high-frequency image of the first captured image classified into a plurality of groups according to the actual measured grayscale from the high-frequency image of the first captured image, a contour image of the low-frequency image of the second captured image classified into a plurality of groups according to the actual measured grayscale from the low-frequency image of the second captured image, and a contour image of the high-frequency image of the second captured image classified into a plurality of groups according to the actual measured grayscale from the high-frequency image of the second captured image, at the positions of the display panel of the display device;

calculating a first similarity index based on the contour image of the low-frequency image of the first captured image and the contour image of the low-frequency image of the second captured image and calculating a second similarity index based on the contour image of the high-frequency image of the first captured image and the contour image of the high-frequency image of the second captured image; and calculating the similarity index based on the first similarity index and the second similarity index.

12. The method of claim 11, wherein the similarity index is determined using an equation "SI=SI1*m+SI2*(1-m)", where SI is the similarity index, SI1 is the first similarity index, SI2 is the second similarity index, and m is a real number greater than 0 and less than 1.

13. The method of claim 7, wherein further includes predicting a first quality index for a first evaluation data by inputting the first evaluation data different from the reference data and the evaluation data into the compensation prediction model.

14. A test device that generates compensation data for a display device comprising:

a data providing block configured to provide reference data having a reference grayscale to the display device and evaluation data having a compensation target grayscale to the display device;

a camera configured to acquire a first captured image by capturing an image displayed on the display device based on the reference data and to acquire a second captured image by an image displayed on the display device based on the evaluation data; and a compensation data generating block configured to:

calculate a similarity index based on a difference between the first captured image and the second captured image at a plurality of positions of a display panel of the display device;

calculate a quality index based on an actual measured grayscale of the second captured image after compensation of the second captured image;

generate a compensation prediction model based on the similarity index and the quality index; and generate the compensation data based on the first captured image, the second captured image, the similarity index, and the compensation prediction model.

15. The test device of claim 14, wherein the quality index is a ratio of minimum luminance of the actual measured grayscale of the second captured image after the compensation of the second captured image to maximum luminance of the actual measured grayscale of the second captured image after the compensation of the second captured image.

16. The test device of claim 14, wherein the compensation prediction model is generated through linear regression for the similarity index and the quality index.

17. The test device of claim 14, wherein the compensation data generating block is configured to compare the similarity index with a threshold value, and to generate the compensation data when the similarity index is greater than the threshold value.

18. The test device of claim 14, wherein the compensation data generating block is configured to:

filter the first captured image into a low-frequency image of the first captured image and a high-frequency image of the first captured image, to filter the second captured image into a low-frequency image of the second captured image and a high-frequency image of the second captured image;

generate a contour image of the low-frequency image of the first captured image classified into a plurality of groups according to an actual measured grayscale from the low-frequency image of the first captured image, a contour image of the high-frequency image of the first captured image classified into a plurality of groups according to the actual measured grayscale from the high-frequency image of the first captured image, a contour image of the low-frequency image of the second captured image classified into a plurality of groups according to the actual measured grayscale from the low-frequency image of the second captured image, and a contour image of the high-frequency image of the second captured image classified into a plurality of groups according to the actual measured grayscale from the high-frequency image of the second captured image, at the positions of the display panel of the display device;

calculate a first similarity index based on the contour image of the low-frequency image of the first captured image and the contour image of the low-frequency image of the second captured image, to calculate a second similarity index based on the contour image of the high-frequency image of the first captured image and the contour image of the high-frequency image of the second captured image; and calculate the similarity index based on the first similarity index and the second similarity index.

19. The test device of claim 18, wherein the similarity index is determined using an equation "SI=SI1*m+SI2*(1-m)", where SI is the similarity index, SI1 is the first similarity index, SI2 is the second similarity index, and m is a real number greater than 0 and less than 1.

20. The test device of claim 14, wherein the compensation data generating block is configured to predict a first quality index for a first evaluation data by inputting the first evaluation data different from the reference data and the evaluation data into the compensation prediction model.

* * * * *